(12) United States Patent
Dong et al.

(10) Patent No.: US 9,835,460 B2
(45) Date of Patent: Dec. 5, 2017

(54) GPS MAP-MATCHING BASED ON SPACE MAP-MATCHING

(71) Applicant: International Business Machines Corporation, Armonk, NY (US)

(72) Inventors: Wei S. Dong, Beijing (CN); Peng Gao, Beijing (CN); Chun Y. Ma, Beijing (CN); Chang S. Li, Beijing (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/980,426

(22) Filed: Dec. 28, 2015

(65) Prior Publication Data

US 2017/0184408 A1    Jun. 29, 2017

(51) Int. Cl.
*G01S 1/00*    (2006.01)
*G01C 21/30*    (2006.01)
(Continued)

(52) U.S. Cl.
CPC ......... *G01C 21/30* (2013.01); *G01C 21/3461* (2013.01); *G01C 21/3492* (2013.01); *G01S 19/48* (2013.01)

(58) Field of Classification Search
CPC  G01C 21/30; G01C 21/3461; G01C 21/3492; G01S 19/48
(Continued)

(56) References Cited

U.S. PATENT DOCUMENTS 6,799,116 B2    9/2004  Robbins
6,931,322 B2    8/2005  Jung et al.
(Continued)

FOREIGN PATENT DOCUMENTS

CN          1455268 A    11/2003
CN         102147261 A    8/2011
(Continued)

OTHER PUBLICATIONS

Davidson, P.; Vazquez, M.A.; Piche, R., "Uninterrupted Portable Car Navigation System Using GPS, Map and Inertial Sensors Data," Consumer Electronics, 2009, ISCE 09. IEEE 13th International Symposium on, vol. 1109/ISCE.2009.5156849.
(Continued)

*Primary Examiner* — Thomas G Black
*Assistant Examiner* — Luke Huynh
(74) *Attorney, Agent, or Firm* — Cahn & Samuels, LLP

(57) ABSTRACT

An embodiment of the invention provides a method that identifies GPS shifting fields for road segments, the GPS shifting fields including areas around the road segments that include false GPS readings of objects that traveled on the road segments. The GPS shifting fields can be revised with a road segment attribute and/or at a driver preference. The road map network can be partitioned into space units, where the road map network can include at least two GPS readings of the object. For each space unit that includes a road segment, a probability that the object was located on the road segment can be calculated for each road segment based on the GPS readings of the object and the GPS shifting fields. The trajectory of the object can be determined based on the computing of the probabilities.

20 Claims, 8 Drawing Sheets

(51) Int. Cl.
  *G01S 19/48* (2010.01)
  *G01C 21/34* (2006.01)
(58) Field of Classification Search
  USPC .................................................. 701/447, 400
  See application file for complete search history.

(56) References Cited

U.S. PATENT DOCUMENTS

| | | | |
|---|---|---|---|
| 7,603,233 B2 | 10/2009 | Tashiro | |
| 8,612,134 B2* | 12/2013 | Zheng | ..................... G01S 19/14 |
| | | | 701/400 |
| 9,593,957 B2* | 3/2017 | Zheng | ................ G01C 21/3484 |

FOREIGN PATENT DOCUMENTS

| | | |
|---|---|---|
| CN | 104330089 A | 2/2015 |
| WO | 2009061058 A1 | 5/2009 |

OTHER PUBLICATIONS

Goh, C.Y.; Dauwels, J.; Mitrovic, N.; Asif, M.T.; Oran, A.; Jaillet, P., "Online Map-Matching Based on Hidden Markov Model for Real-Time Traffic Sensing Applications," Intelligent Transportation Systems (ITSC), 2012 15th International IEEE Conference on, vol., No., pp. 766-781, Sep. 16-19, 2012.

Li, X.; Li, M.; Shu, W.; Wu, M., "A Practical Map-Matching Algorithm for GPS-Based Vehicular Networks in Shanghai Urban Area," in Wireless, Mobile and Sensor Networks, 2007, IET Conference on, vol., No., pp. 454-457, Dec. 12-14, 2007.

* cited by examiner

GPS MAP-MATCHING BASED ON SPACE MAP-MATCHING

BACKGROUND

The present invention relates to systems, methods, and computer program products for Global Positioning System (GPS) map-matching based on space map-matching. GPS road map matching is the process of analyzing sequential noisy GPS data of a moving object and identifying the precise moving trajectory aligned with a road map network. Map matching is the basis of numerous location based services in connected-vehicle applications. Map matching methods consider a sequence of GPS points and selects candidate links for each GPS point in the sequence. A virtual network structure is constructed based on the selected candidates and a shortest path search is performed on the virtual network.

SUMMARY OF THE INVENTION

An embodiment of the invention provides a method comprising for identifying a trajectory of an object on a map, the trajectory being aligned with road segments in a road map network. A GPS shifting field constructor can identify GPS shifting fields for at least two of the road segments, where the GPS shifting fields include areas around the road segments that include false GPS readings of objects that traveled on the road segments. The GPS shifting field constructor can revise the GPS shifting fields with a road segment attribute and/or at a driver preference. The road segment attribute can include the road segment name, locative information for the road segment name, and/or a popularity score for the road segment name. The driver preference can include a preferred road, an unpreferred road, a shortest route preference, a quickest route preference, and/or a no toll preference.

A GPS shifting field indexer connected to the GPS shifting field constructor can partition the road map network into space units, where the road map network can include at least two GPS readings of the object. For each space unit that includes a road segment, a virtual network constructor connected to the GPS shifting field indexer can calculate for each road segment in the space unit, a probability that the object was located on the road segment based on the GPS readings of the object and the GPS shifting fields. A most possible path searcher connected to the virtual network constructor can determine the trajectory of the object based on the computing of the probabilities.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a method of GPS map matching that considers the GPS shifting pattern driven from historical map-matching results and transforms the spatial search process into a table look-up process. Before the map-matching process, a GPS shifting field constructor can construct a GPS shifting field for each road link (also referred to herein as a "road segment") based on historical map-matching results. The GPS shifting fields can be revised with road link attributes and one or more driver preferences. A GPS shifting field indexer can partition the domain space into space units and pre-compute the probability of each road link for each space unit based on the GPS shifting fields. The pre-computed results can be indexed in a spatial index structure. A GPS shifting field searcher can return candidate links for a given GPS point by locating the GPS point into one space unit and then returning all road links or road links with highest probabilities corresponding to the space unit.

A system for map matching can recognize that GPS shifting is not totally random. There can only be a minor shift in GPS positions on certain roads when compared to other roads. In many cases, the roads with greater GPS shifting can have less probability to be the road actually traveled and should not be considered even if the GPS point is closer to them than other roads. GPS shifting can have an obvious pattern for many links due to the physical surroundings.

Assuming that vehicles always choose the shortest path to travel may not be correct in reality. Drivers may choose the fastest path (highway, less traffic lights, etc.) rather than the shortest path. Driver preferences can be learned from historical data; and, popular roads may have a higher probability of being the actual roads traveled.

In at least one embodiment, the GPS shifting pattern reveals a mapping relationship between the GPS observation locations and the road links, which can be used to select candidate links for raw GPS points. GPS shifting fields can be constructed for each road link before map-matching. During map-matching, candidate links can be selected for each raw GPS point by searching the GPS shifting fields.

Driver preferences and road network attributes (e.g., level, capacity) can be considered to revise the GPS shifting fields. Links that are not possible can be pruned during candidate selection; and, less candidate links may be included in the virtual network structure.

Figure 1:
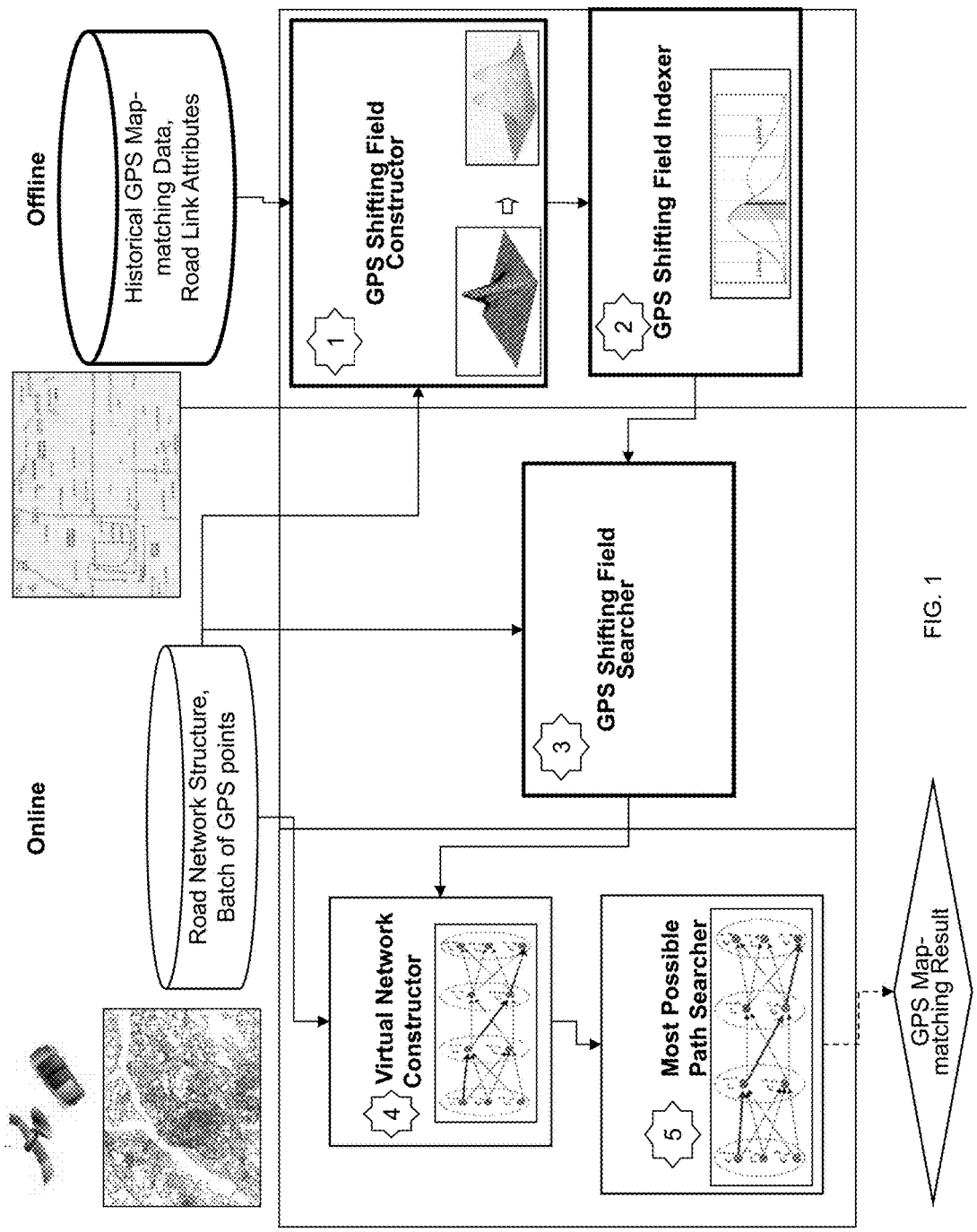
FIG. 1 is a diagram illustrating a system and method to perform GPS map matching based on a GPS shifting field according to an embodiment of the invention.

FIG. 1 is a diagram illustrating a system and method to perform GPS map matching based on a GPS shifting field according to an embodiment of the invention. Historical GPS map-matching data and road link attributes can be received by the system; and, a GPS shifting field constructor can construct a GPS shifting field for each road link and revise the result with driver preferences and road link attributes (1).

More specifically, the GPS shifting field constructor can receive as input road link attributes (e.g. level, capacity), GPS map-matching result, and/or GPS-link pairs <Loc_obs, linkID> from historical datasets. A historical GPS shifting probability distribution function can be derived for each road link. The system can find all GPS-link pairs <Loc_obs, linkID> in the historical dataset (the foot point of Loc_obs on link is treated as real location and Loc_obs is shifted location). The probability distribution function can be calculated for the road link (e.g., Bayesian)

Figure 2:
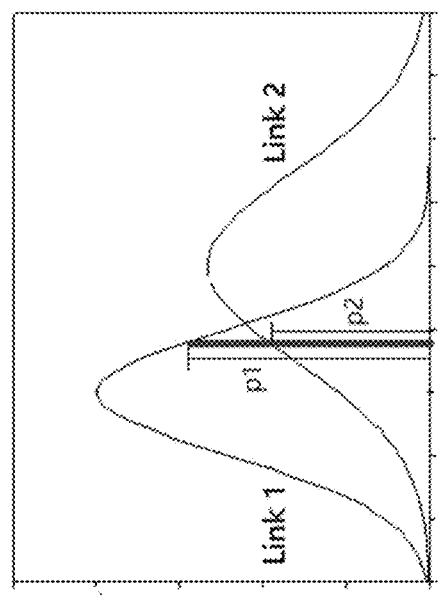
FIG. 2 is a graph illustrating set popularity weights for road link 1 and road link 2 according to an embodiment of the invention.

The system can set a popularity weight for each road link (FIG. 2). Specifically, the system can give each link an initial weight based on road link attributes and compute the passed count (number of GPS-link pairs with linkID equals to the link) based on the historical dataset. The initial weight can be revised based on the passed count to obtain the popularity weight. The system can obtain the GPS shifting fields by overlapping the weighted shifting probability distribution functions of links.

Figure 3:
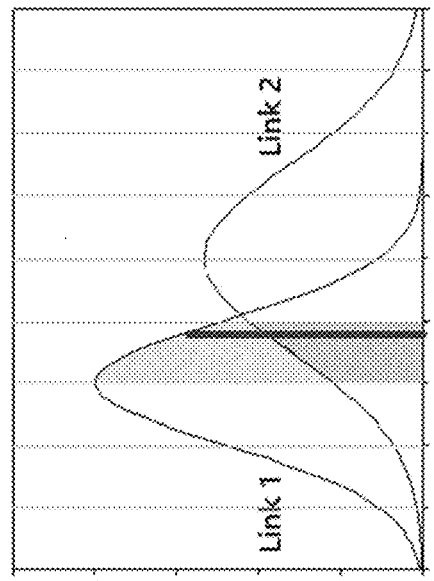
FIG. 3 is a graph illustrating the GPS shifting fields according to an embodiment of the invention.

A GPS shifting field indexer can index the GPS shifting fields by compressing and pre-computing (2). The field of each link could theoretically cover the whole domain space. Therefore, the system indexes the GPS shifting fields by compressing and pre-computing. In particular, the system can divide the road link space into space units, pre-compute the probability of each link for each space unit, and store the results in the form of {U: (l1, p1), (l2, p2), . . . }. FIG. 3 is a graph illustrating the GPS shifting fields according to an embodiment of the invention.

In at least one embodiment, the system partitions the entire road link space into space units (e.g., a grid). For each space unit U, the system can compute the probabilities that point located within should be mapped to each road link and obtain a link list {U: (l1, p1), (l2, p2), . . . } where links are sorted by probability p. The system may only retain links with a probability higher than a threshold. The link list of each space unit can be indexed with spatial indices (e.g., grid index, geohash)

A GPS shifting field searcher can obtain candidate links for GPS points by searcher to indexed GPS shifting fields (3). The system can search the indexed GPS shifting fields to select candidates for raw GPS points (each space unit: {U: (l1, p1), (l2, p2), . . . }). For each sample GPS point p, the system can find the space unit U covering the sample point p based on the space units' boundary information. This processes can be very fast when space partition techniques like grid are used. Additionally, for each sample GPS point p, the system can return the links in U's link list as the candidate links of p. The system can return only road links with probabilities above a predetermined threshold.

A virtual network constructor can construct a virtual network structure based on selected candidates (4); and, a most possible path searcher can perform a path search on the virtual network (5). In at least one embodiment, items (1) and (2) are performed offline and items (3)-(5) are performed online.

At least one embodiment of the invention provides a system and method to perform GPS map-matching based on GPS shifting field. A GPS shifting field constructor can construct a GPS shifting field and revise the GPS shifting field with driver preferences and road link attributes. A GPS shifting field indexer can partition the domain space into space units and pre-compute the probability of each road links for each space unit ({u: (l1, p1), (l2, p2), . . . }). The pre-computed results can be indexed in a spatial index structure. A GPS shifting field searcher can locate the sample point into one space unit and return all or part of links corresponding to the space unit as candidate links of the raw GPS point.

Figure 4:
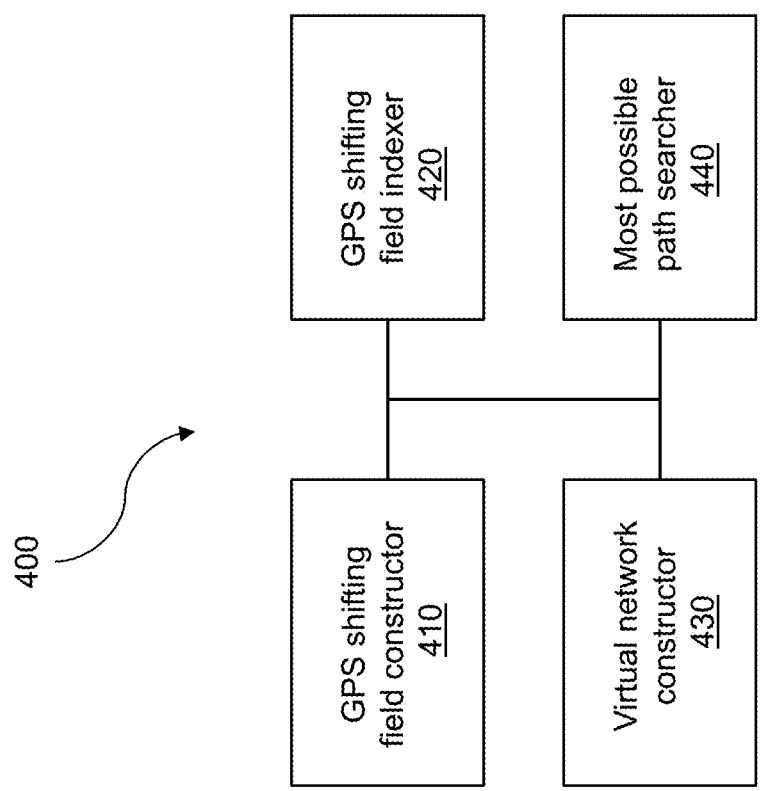
FIG. 4 is a diagram illustrating a system for identifying the trajectory of an object on a map, wherein the trajectory is aligned with road segments in a road map network according to an embodiment of the invention.
Figure 5:
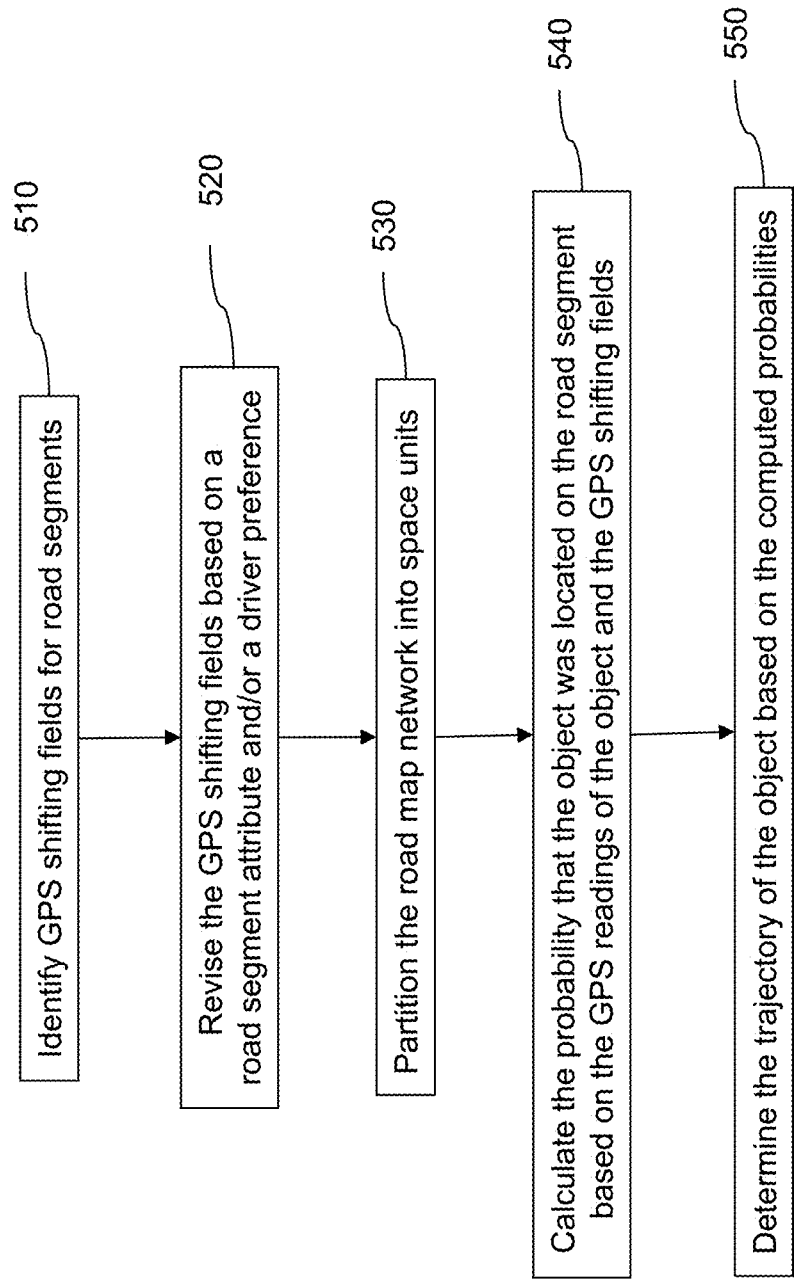
FIG. 5 is a flow diagram illustrating a method for identifying the trajectory of an object on a map, wherein the trajectory is aligned with road segments in a road map network according to an embodiment of the invention.

FIG. 4 is a diagram illustrating a system 400 for identifying the trajectory of an object on a map, wherein the trajectory is aligned with road segments (also referred to herein as "road links" or "roads") in a road map network according to an embodiment of the invention. FIG. 5 is a flow diagram illustrating a method for identifying the trajectory of an object on a map according to an embodiment of the invention (e.g., using the system 400). In at least one embodiment, the system and method are performed on a map of route segments, which can include sidewalks, walking paths, hiking trails, biking paths, etc. Thus, the trajectory and location information is not limited to roadways.

A GPS shifting field constructor 410 can identify GPS shifting fields for the road segments (510), where a GPS shifting field includes an area around a road segment that includes false GPS readings of objects that traveled on the road segment. Thus, the GPS shifting field can represent the area in which an object may be located based on historical GPS readings. As used herein, the term "GPS shifting field constructor" includes a computer hardware device, such as a processor or a central processing unit (CPU).

The GPS shifting field constructor 410 can revise the GPS shifting fields based on a road segment attribute and/or a driver preference (520). The road segment attribute can include the road name, locative information for the road (e.g., GPS coordinates), a popularity score for the road (e.g., score of 1-100), elevation information (e.g., meters above sea level), terrain information (e.g., asphalt, dirt, gravel), and/or number of lanes. A road segment attribute can reduce the size of a GPS shifting field or increase the size of the GPS shifting field. For example, a low popularity score can decrease the size of the GPS shifting field; and, a high popularity score can increase the size of the GPS shifting field.

The driver preference can include a preferred road, an unpreferred road, a shortest route preference, a quickest route preference, and a no toll preference. A driver preference can reduce the size of a GPS shifting field or increase the size of the GPS shifting field. For example, an unpreferred road can decrease the size of the GPS shifting field; and, a preferred road can increase the size of the GPS shifting field. In another example, a no toll preference can decrease the size of the GPS shifting field. The revision of the GPS shifting fields can reduce the sizes of the GPS shifting fields. In at least one embodiment, a larger GPS shifting field makes it more likely that the object will be identified to be on this road as opposed to another road. In at least one embodiment, revising the GPS shifting fields reduces or increases the values in the GPS shifting fields.

A GPS shifting field indexer 420 can partition the road map network into space units (e.g., a grid pattern) (530), where the road map network includes at least two GPS readings of the object. As used herein, the term "GPS shifting field indexer" includes a computer hardware device connected to the GPS shifting field constructor, such as a processor or CPU. As used herein, the term "connected" includes operationally connected, logically connected, in communication with, physically or wirelessly connected, engaged, coupled, contacts, linked, affixed, and attached.

For each road segment in a space unit, a virtual network constructor 430 calculates the probability that the object was located on the road segment based on the GPS readings of the object and the GPS shifting fields (540). As used herein, the term "virtual network constructor" includes a computer hardware device connected to the GPS shifting field indexer, such as a processor or CPU.

The GPS shifting field indexer 420 can calculate the probability that the object was located on the road segment based on the distance of a GPS reading of the object from a GPS shifting field of the road segment. For example, a space unit includes road segment X with a GPS shifting field X'. When a GPS reading of the object is located in or within a threshold distance from the GPS shifting field X', the probability that the object was located on road segment X is high. When a GPS reading of the object is located outside of the threshold distance from the GPS shifting field X', the probability that the object was located on road segment X is low. The threshold distance can be predetermined and/or modified by the user or administrator of the system. When there are no GPS readings for the object in the space unit, the probability that the object was located on road segment X can be zero (0).

The GPS shifting field indexer 420 can calculate a higher probability for a first road segment with respect to a second road segment when a GPS reading of the object is located closer to a GPS shifting field of the first road segment than a GPS shifting field of the second road segment. For example, a space unit includes road segment A with a GPS shifting field A' and road segment B with a GPS shifting field B'. When a GPS reading of the object is located in the GPS shifting field A' and outside of the GPS shifting field B', the probability that the object was located on road segment A is high and the probability that the object was located on road segment B is low. When a GPS reading of the object is located closer to the GPS shifting field A' than the GPS shifting field B', the probability that the object was located on road segment A is higher than the probability that the object was located on road segment B. In at least one embodiment of the invention, the probabilities are calculated by the virtual network constructor 430.

A most possible path searcher 440 can determine the trajectory of the object based on the computed probabilities (550). For example, when the most possible path searcher 440 identifies that the probabilities that the object was located on 7th Street, Main Street, 14th Street, and National Highway each exceed a threshold level of probability, the most possible path searcher 440 determines that the trajectory of the object includes 7th Street, Main Street, 14th Street, and National Highway. As used herein, the term "most possible path searcher" includes a computer hardware device connected to the virtual network constructor, such as a processor or CPU.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
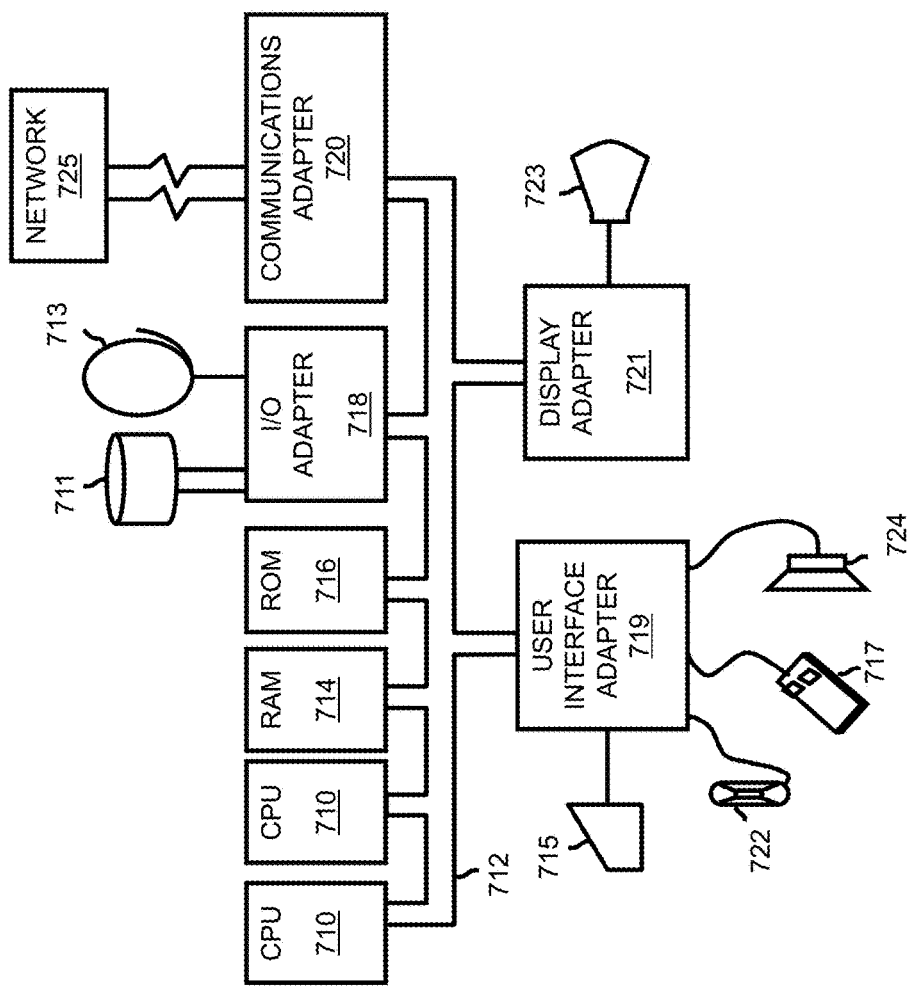
FIG. 6 is diagram illustrating a computer program product for identifying the trajectory of an object on a map, wherein the trajectory is aligned with road segments in a road map network according to an embodiment of the invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 710. The CPUs 710 are interconnected with system bus 712 to various devices such as a random access memory (RAM) 714, read-only memory (ROM) 716, and an input/output (I/O) adapter 718. The I/O adapter 718 can connect to peripheral devices, such as disk units 711 and tape drives 713, or other program storage devices that are readable by the system. The system can read the inventive instructions on the program storage devices and follow these instructions to execute the methodology of at least one embodiment of the invention. The system further includes a user interface adapter 719 that connects a keyboard 715, mouse 717, speaker 724, microphone 722, and/or other user interface devices such as a touch screen device (not shown) to the bus 712 to gather user input. Additionally, a communication adapter 720 connects the bus 712 to a data processing network 725, and a display adapter 721 connects the bus 712 to a display device 723 which may be embodied as an output device such as a monitor, printer, or transmitter, for example.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
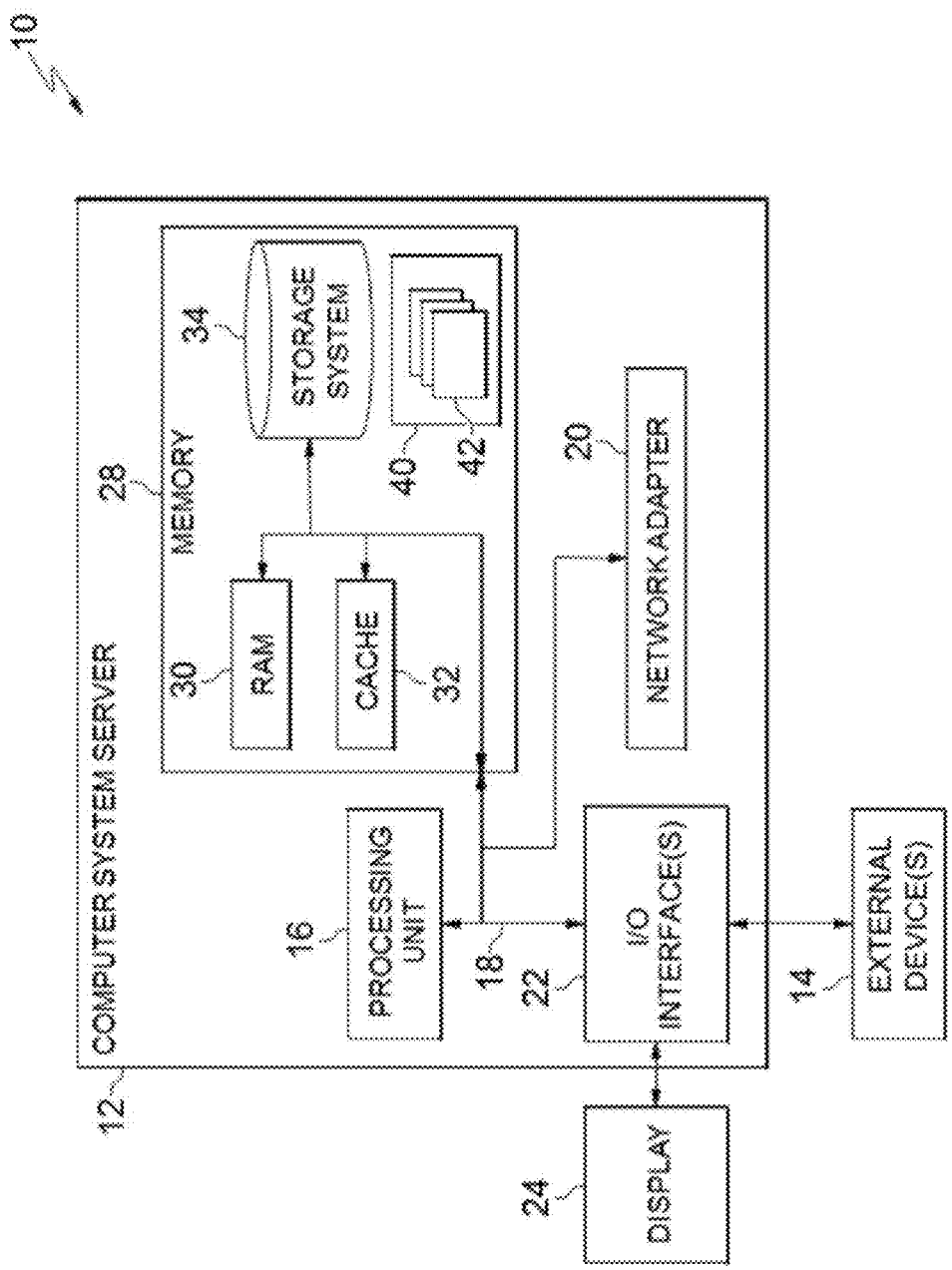
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
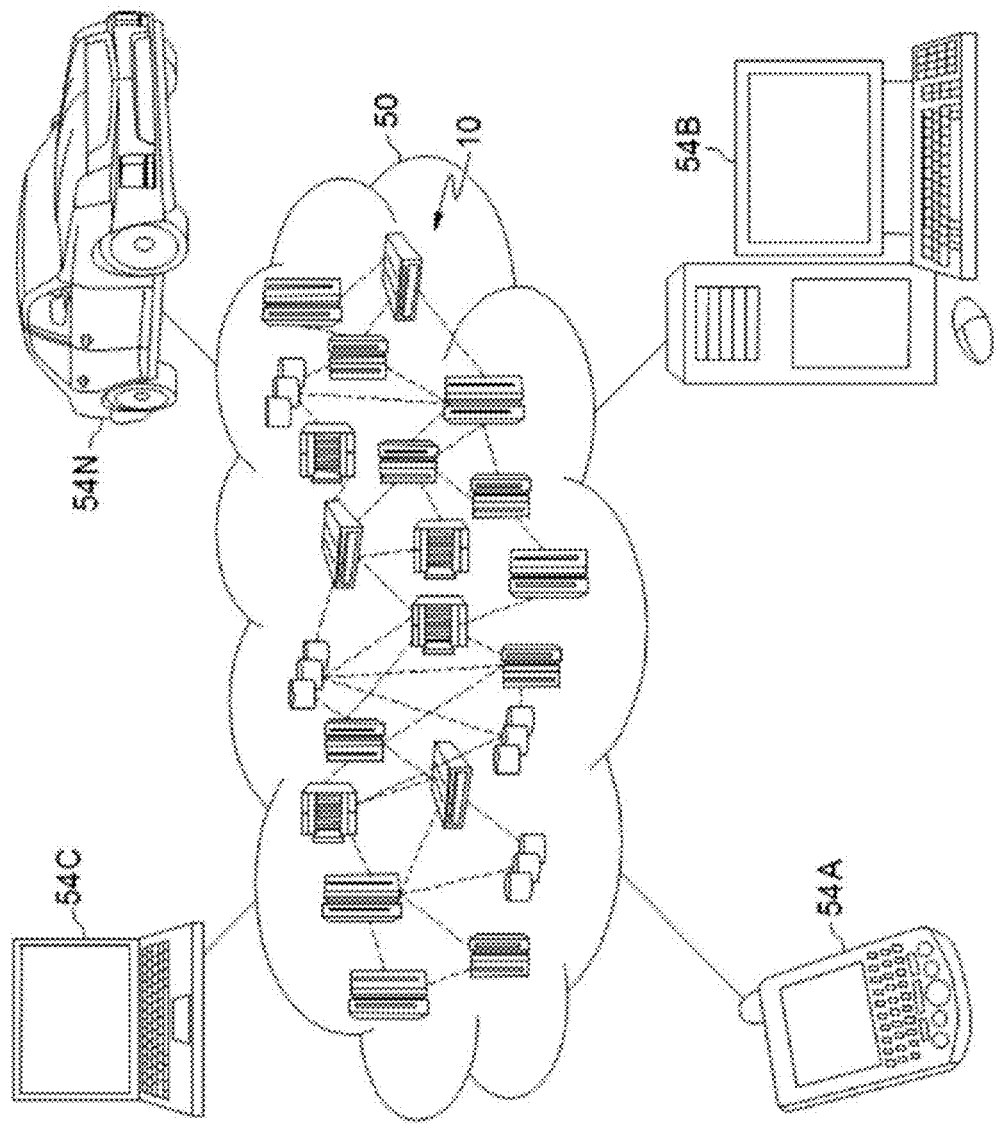
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
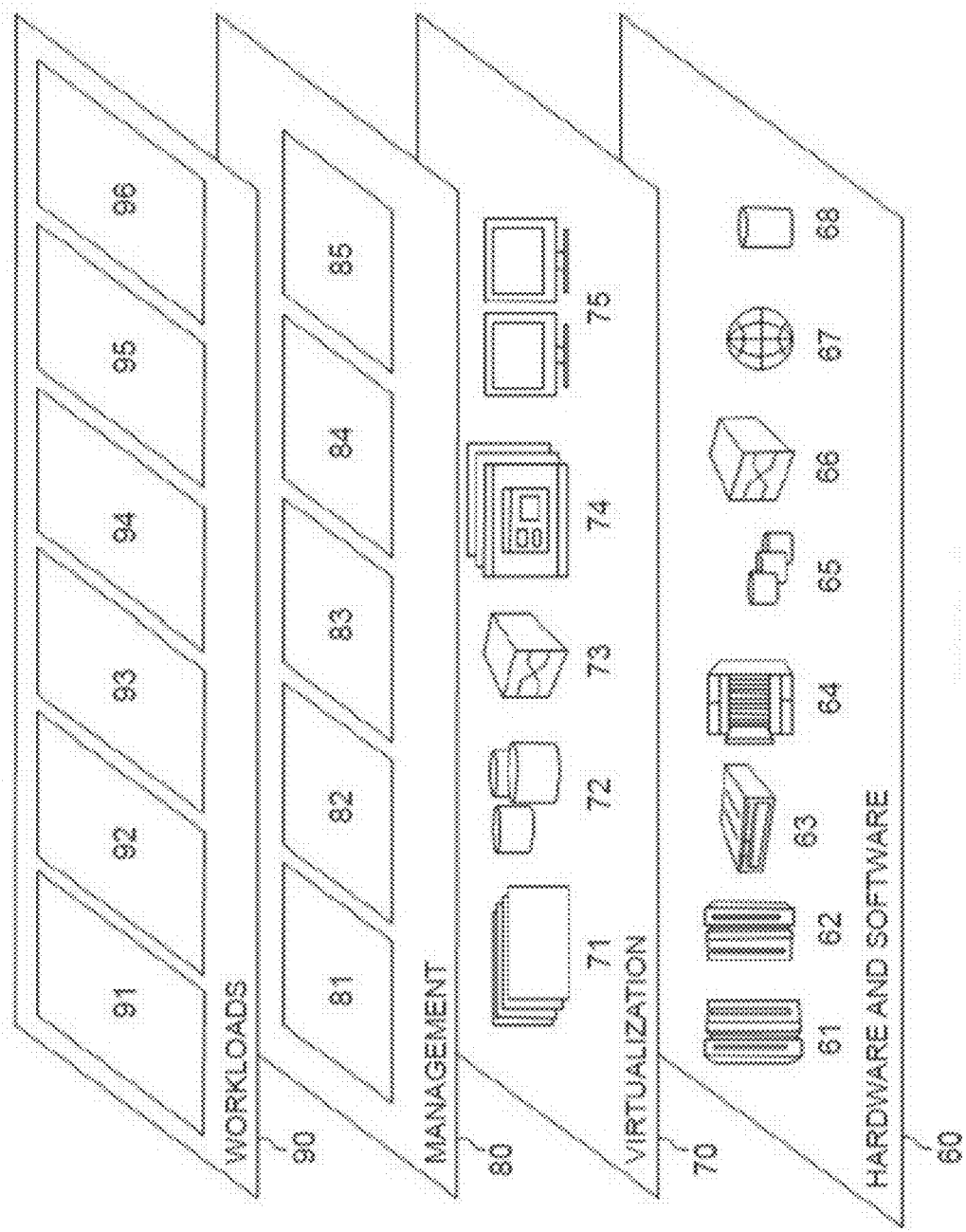
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GPS map-matching 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated

What is claimed is:

1. A method of identifying a trajectory of an object on a map, the trajectory being aligned with road segments in a road map network, said method comprising:

identifying global positioning system (GPS) shifting fields for at least two of the road segments with a GPS shifting field constructor including a first processor, each GPS shifting field of the GPS shifting fields including an area around a road segment of the road segments that includes false GPS readings of objects that travelled on the road segment;

revising the GPS shifting fields with the GPS shifting field constructor, the GPS shifting fields being revised with at least one of a road segment attribute and at a driver preference, the road segment attribute including at least one of a road segment name, locative information for the road segment name, and a popularity score for the road segment name, and the driver preference including at least one of a preferred road, an unpreferred road, a shortest route preference, a quickest route preference, and a no toll preference;

partitioning the road map network into space units with a GPS shifting field indexer including a second processor connected to the GPS shifting field constructor, the road map network including at least two GPS readings of the object;

for each space unit that includes at least one road segment of the road segments, calculating for each road segment in the space unit with a virtual network constructor including a third processor connected to the GPS shifting field indexer, a probability that the object was located on the road segment in the space unit based on the GPS readings of the object and the GPS shifting fields; and determining the trajectory of the object with a most possible path searcher including a fourth processor connected to the virtual network constructor, the trajectory of the object being determined based on said computing of the probabilities.

2. The method according to claim 1, wherein said revising the GPS shifting fields includes reducing sizes of the GPS shifting fields.

3. The method according to claim 1, wherein the road segment attribute one of reduces a size of a GPS shifting field and increases the size of the GPS shifting field.

4. The method according to claim 1, wherein the driver preference one of reduces a size of a GPS shifting field and increases the size of the GPS shifting field.

5. The method according to claim 1, wherein said calculating of the probability that the object was located on the road segment in the space unit includes calculating the probability based on a distance of a GPS reading of the object from a GPS shifting field of the road segment in the space unit.

6. The method according to claim 1, wherein said calculating of the probability that the object was located on the road segment in the space unit includes calculating a higher probability for a first road segment in the space unit with respect to a second road segment in the space unit when a GPS reading of the object is located closer to a GPS shifting field of the first road segment in the space unit than a GPS shifting field of the second road segment in the space unit.

7. A method of identifying a trajectory of an object on a map, the trajectory being aligned with route segments in a route map network, said method comprising:

identifying global positioning system (GPS) shifting fields for at least two of the route segments with a GPS shifting field constructor, each GPS shifting field including an area around a route segment that includes false GPS readings of objects that traveled on the route segment;

partitioning the route map network into space units with a GPS shifting field indexer connected to the GPS shifting field constructor, the route map network including at least two GPS readings of the object;

for each space unit that includes a route segment, calculating for each route segment in the space unit with a virtual network constructor connected to the GPS shifting field indexer, a probability that the object was located on the route segment based on the GPS readings of the object and the GPS shifting fields; and determining the trajectory of the object with a most possible path searcher connected to the virtual network constructor, the trajectory of the object being determined based on said computing of the probabilities.

8. The method according to claim 7, further comprising revising the GPS shifting fields with at least one route segment attribute and at least one driver preference.

9. The method according to claim 8, wherein the route segment attribute includes at least one of a route segment name, locative information for the route segment, popularity score for the route segment, elevation information, terrain information, and number of lanes.

10. The method according to claim 8, wherein the route segment attribute includes a route segment name, locative information for the route segment, popularity score for the route segment, elevation information, terrain information, and number of lanes.

11. The method according to claim 8, wherein the driver preference includes at least one of a preferred route, an unpreferred route, a shortest route preference, a quickest route preference, and a no toll preference.

12. The method according to claim 8, wherein the driver preference includes a preferred route, an unpreferred route, a shortest route preference, a quickest route preference, and a no toll preference.

13. The method according to claim 8, wherein said revising the GPS shifting fields includes reducing sizes of the GPS shifting fields.

14. The method according to claim 7, wherein the route segment attribute one of reduces a size of a GPS shifting field and increases the size of the GPS shifting field.

15. The method according to claim 7, wherein the driver preference one of reduces a size of a GPS shifting field and increases the size of the GPS shifting field.

16. The method according to claim 7, wherein said calculating of the probability that the object was located on the route segment includes calculating the probability based on a distance of a GPS reading of the object from a GPS shifting field of the route segment.

17. The method according to claim 7, wherein said calculating of the probability that the object was located on the route segment includes calculating a higher probability for a first route segment with respect to a second route segment when a GPS reading of the object is located closer to a GPS shifting field of the first route segment than a GPS shifting field of the second route segment.

18. A computer program product for identifying a trajectory of an object on a map, the trajectory being aligned with road segments in a road map network, said computer program product comprising:

a computer readable storage medium having stored thereon:

first program instructions executable by a device to cause the device to identify global positioning system (GPS) shifting fields for at least two of the road segments, each GPS shifting field of the GPS shifting fields including an area around a road segment of the road segments that includes false GPS readings of objects that traveled on the road segment;

second program instructions executable by a device to cause the device to revise the GPS shifting fields, the GPS shifting fields being revised with at least one of a road segment attribute and at a driver preference, the road segment attribute including at least one of a road segment name, locative information for the road segment name, and a popularity score for the road segment name, and the driver preference including at least one of a preferred road, an unpreferred road, a shortest route preference, a quickest route preference, and a no toll preference;

third program instructions executable by a device to cause the device to partition the road map network into space units, the road map network including at least two GPS readings of the object;

fourth program instructions executable by a device to cause the device to, for each space unit that includes at least one road segment of the road segments, calculate for each road segment in the space unit a probability that the object was located on the road segment in the space unit based on the GPS readings of the object and the GPS shifting fields; and fifth program instructions executable by a device to cause the device to determine the trajectory of the object based on the computing of the probabilities.

19. The computer program product according to claim 18, wherein the road segment attribute one of reduces a size of a GPS shifting field and increases the size of the GPS shifting field, and wherein the driver preference one of reduces a size of a GPS shifting field and increases the size of the GPS shifting field.

20. The computer program product according to claim 18, wherein fourth program instructions calculates the probability based on a distance of a GPS reading of the object from a GPS shifting field of the road segment in the space unit.

* * * * *